United States Patent [19]

Schabert et al.

[11] 3,734,825
[45] May 22, 1973

[54] DEVICE FOR CONTROLLING AND SHUTTING-DOWN PRESSURIZED-WATER NUCLEAR REACTOR

[75] Inventors: Hans-Peter Schabert, Erlangen; Hartmut Seibelberger, Braeunighof, both of Germany

[73] Assignee: Siemens Aktiengesellschaft, Berlin, Germany

[22] Filed: Sept. 7, 1971

[21] Appl. No.: 178,270

[30] Foreign Application Priority Data

Sept. 8, 1970  Germany...................P 20 44 303.2

[52] U.S. Cl. ...............................176/36 R, 176/86 R
[51] Int. Cl. ................................................G21c 7/12
[58] Field of Search ..........................176/36 R, 86 R

[56] References Cited

UNITED STATES PATENTS 3,625,816  12/1971  Aleite et al. .........................176/36 R Primary Examiner—Carl D. Quarforth
Assistant Examiner—Harvey E. Behrend
Attorney—Arthur E. Wilfond, Herbert L. Lerner and Daniel J. Tick

[57] ABSTRACT

A dual control member serves to control and shutdown a pressurized-water nuclear reactor and has a control element that includes a plurality of finger control rods secured to a central drive rod through a spider-shaped holder and a shutdown member held by a drive tube surrounding the drive rod and having a separate coaxial spider-shaped holder for a plurality of finger shutdown rods.

13 Claims, 5 Drawing Figures

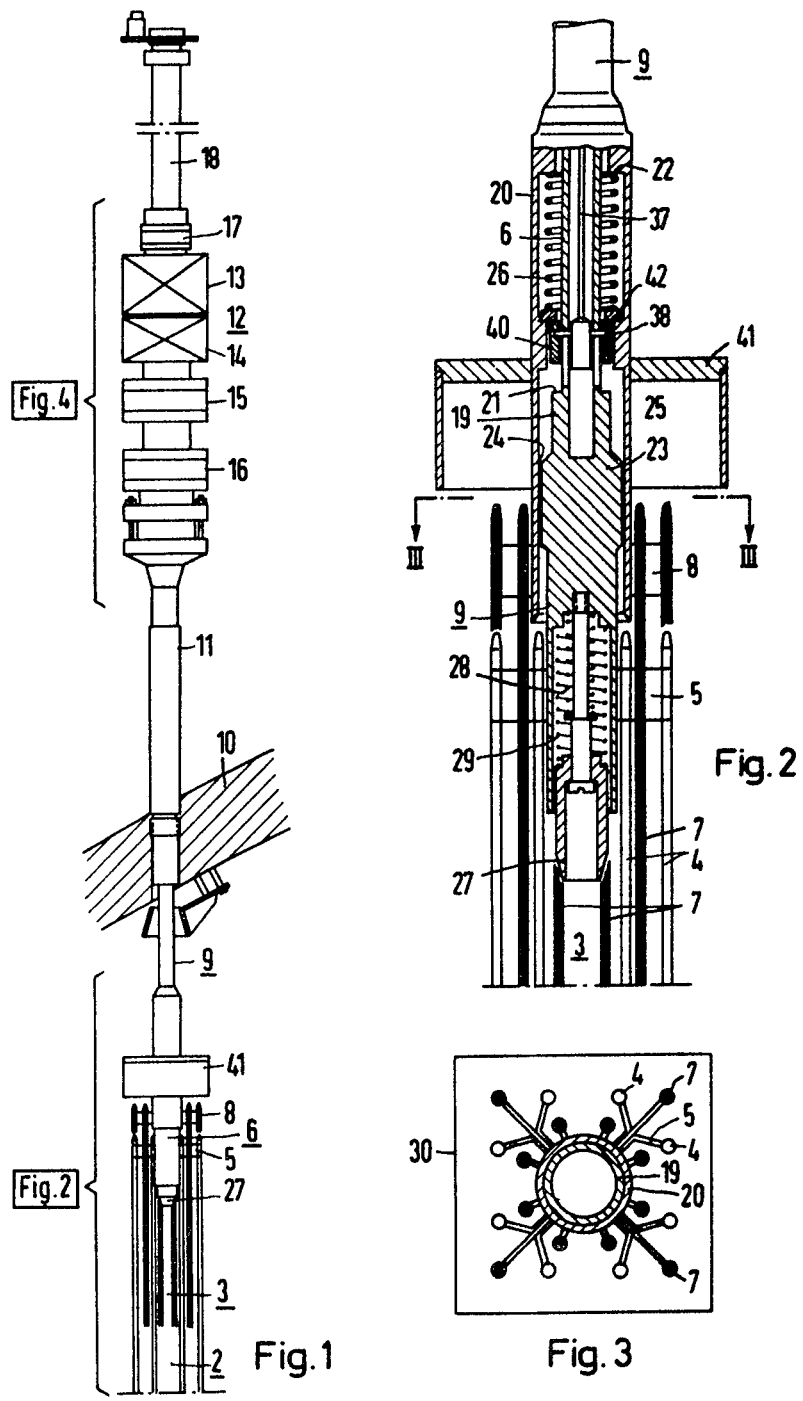

Patented May 22, 1973

DEVICE FOR CONTROLLING AND SHUTTING-DOWN PRESSURIZED-WATER NUCLEAR REACTOR

The invention relates to device for controlling and shutting-down pressurized-water nuclear reactor.

In order to increase the total thermal output of a pressurized-water nuclear reactor, a very uniform power distribution must be achieved. To this end, in addition to the known boric acid contamination of the coolant, a very great number of mechanically displaced absorber rods are required which are distributed over the nuclear core as uniformly as possible. These absorber rods are driven into the control rod guide tubes of certain fuel elements of the reactor core. An important problem that is encountered is the cost of the control elements and their drives, as well as the space requirement for the drives on the cover of the pressure vessel, because in addition to the "grey" control elements, generally numerous further "black" control elements are needed to shut off the reactor. In this connection, particularly $B_4C$ or AgInCd are suitable as neutron-absorbing material. In heretofore known nuclear reactors, only about one fourth of the totally available control drive positions can therefore be occupied by grey rods, which may be inserted in the core also at full load, because the remaining control drive positions are required for black rods because of the shut-off reactivity. For this reason, the absorber material for the control of the power distribution can be accommodated only rather imperfectly in fine distribution within the core.

It is therefore an object of the invention to provide a device for controlling and shutting-down nuclear reactors which affords, with little space requirement, a uniformly fine distribution of the grey rods in the reactor core so that the total thermal output of the reactor is increased, and moreover, which simultaneously assures a reliable shutdown of the reactor.

With the foregoing and other objects of the invention, there is provided a device for controlling and shutting-down nuclear reactors comprising a dual control member having a control member with one or more finger control rods secured to a central drive rod through a spider-like holder, and a shut-off member having a separate coaxial spider-shaped holder for a plurality of finger shut-off rods.

Through this dual control member, a considerable increase in the number of grey control members is possible without reducing the number of the required black control members, no appreciable changes being necessary in the fuel elements in the core frame and at the lid of the vessel itself.

In the dual control member the spider-shaped mounting of the shutdown member is disposed above that of the control member and the shutdown member bears against the holder of the control member when it is being raised. The shutdown member has a separate drive tube which coaxially surrounds the drive rod of the control member.

A conventional magnetic pawl step lifting mechanism can be used to drive the control member. Since the shutdown member, however, is either fully inserted into the reactor core or fully withdraw from it, a holding device is required for it only in the withdrawn condition thereof. The upper end of the drive tube for the shutdown member can be constructed as a hollow armature and be held by an electromagnet holding coil coaxially surrounding the housing for the control drive in such a manner that, upon de-energizing the electromagnet holding coil, the shutdown member falls into the reactor core through the action of gravity.

The shutdown member is withdrawn by entrainment of the shutdown member by the control member. For this purpose, the lower end of the drive tube for the shutdown member is widened in the vicinity of the spider-shaped holder of the control rod so as to correspond in shape to the reinforced lower end of the drive rod of the control member in such a manner that an upper shoulder formed on the reinforced part of the drive rod end entrains the shutdown member as it is lifted.

In order to brake the fall of the shutdown member when it abuts the spider-shaped holder of the control member, there is provided, in accordance with the invention, a helical spring disposed coaxially to the drive rod above the shoulder formed on the widened end portion of the drive rod. However, it is also possible to construct the lower end of the drive tube, alone or as an additional measure, in accordance with the invention, as a dashpot having an inwardly extending bead-like reinforcement defining a minimal flow gap between the drive tube and the drive rod.

There is further located at the lower end of the drive rod, in accordance with another feature of the invention, a helical spring which brakes an end piece telescopically inserted in the drive rod and which brakes the control member itself. In addition, a scales spring is provided, according to the invention, at the lower end of the drive rod, and becomes effective only when the shutdown member falls. This scales spring can simultaneously be used for position indication by providing for the fallen shutdown member a monitoring coil which indicates the position of the control member when the scales spring is compressed.

Another possible means, in accordance with the invention, for indicating the position of the fallen shutdown member, comprises an indicator rod, which is resiliently held within the drive rod and above the reinforced drive rod section and ends in two pins extending to the outside of the drive rod and having a ring connected therewith, in such a manner that, when the shutdown member falls, the indicator rod is pulled downwardly by the impact of the reinforced end of the drive tube on the ring. To this end, a monitoring coil is disposed coaxially to the upper end of the indicator rod. The disturbance caused by the mass of the indicator rod on stepwise motion is controllable by a tensioning spring and, if required, by a hydraulic dashpot. In order to accelerate the falling of the shutdown member, in accordance with the further feature of the invention, the drive tube can be coupled with a catapult spring which can be tensioned during the withdrawal of the shutdown members and which has an accelerating effect on the falling of the shutdown member when the electromagnet holding coil is de-energized.

Other features which are considered as characteristics for the invention are set forth in the appended claims.

Although the invention is illustrated and described herein as embodies in device for controlling and shutting-down pressurized-water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a longitudinal view of the dual control member of the invention with a drive mounted thereon;

FIG. 2 is an enlarged longitudinal sectional view of the lower part of the dual control member of FIG. 1, shown with two spider-shaped holders;

FIG. 3 is a cross-sectional view of FIG. 2 taken along the line III—III in direction of the arrows facing toward the spider-shaped holders;

Figure 4:
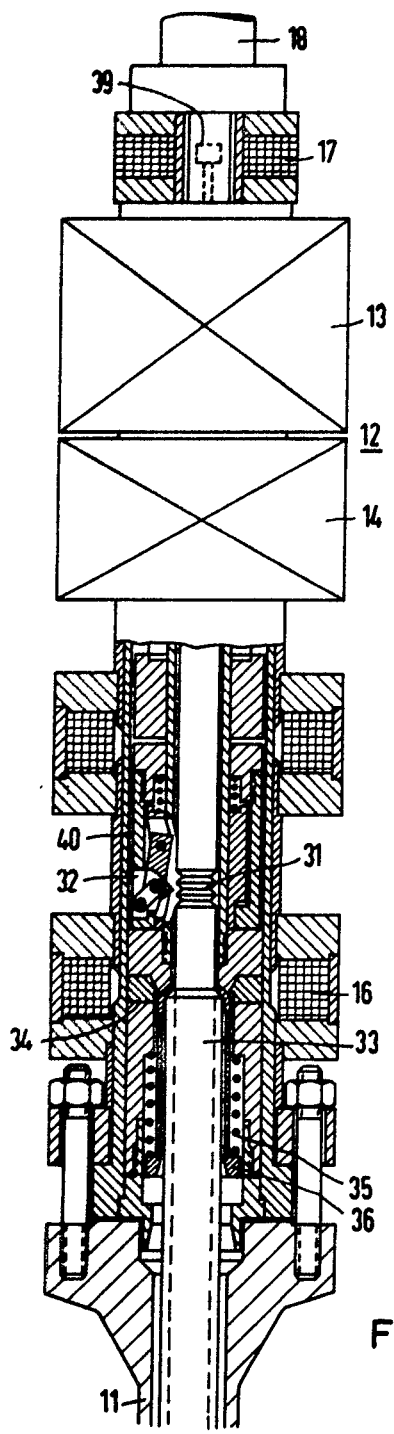
FIG. 4 is an enlarged longitudinal view of the drive of the dual control member shown in FIG. 1.

Referring now to the drawings and first, particularly to the overall view of FIG. 1, there is shown a dual control member 1 formed of a control member 2 and a shutdown member 3. The control member 2 is made up of a number of grey finger control rods 4 (FIGS. 2 and 3) which are secured to a central drive rod 6 through a common spider-shaped holder 5. The shut-off member 3 has a number of black finger shut-off rods 7 that are secured to a drive tube 9 surrounding the drive rod 6 through another spider-shaped holder 8. The drive rod 6 and the drive tube 9 extend upwardly coaxially to the drives through an extension tube 11 which is welded into the cover 10 of a reactor pressure vessel. The drive for the control element 2 is formed of a conventional pawl step lifter 12 which is made up of a lifting coil 13, an engagement coil 14 and a holding coil 15, that will be described in greater detail hereinafter with respect to FIG. 4. A holding coil 16 for the shutdown member 3 is disposed below the pawl step lifter 12. At the upper end of the drive, there is further located an electromagnet coil 17 for indicating the position of the shutdown member 3, and thereabove, additional position-indicating devices 18 for the control member 1, that are not shown in detail.

In FIG. 2, the lower part of the dual control member 1 is shown in greater detail on an enlarged scale. The spider-shaped holder 5 for the grey finger control rods 4 is secured to the reinforced lower section 19 of the central drive rod 6. The spider-shaped holder 8 of the shutdown member 3 is located above the holder 5 for the control member 2, and can rest on the holder 5 of the control member 2 when the shutdown member 3 drops. After dropping in, the shutdown member 3 can be raised again only by withdrawing the control member 2. For this purpose, the lower end 20 of the drive tube 9 is widened to correspond to the width of the lower reinforced drive rod section 19. When the control member 2 is raised, an upper shoulder 21 of the drive rod end section 19 then rests or abuts the widened part 22 of the drive tube 9 and therefore draws the shutdown member 3 upwardly.

If the shutdown and control members are scrammed or dropped in the course of a rapid shutdown of the reactor, the finger shock absorbers in the fuel elements normally become effective. In an exceptional case, however, a shut-off member can drop onto a control member which is, for example, half-raised.

In order to brake the impact of the fall of the shutdown element in such a case, the lower end 20 of the drive tube 9 is moreover constructed as a dashpot by providing at the reinforced section 19 of the central drive 6, a bead-like beefed-up or reinforced portion 23, so that only a narrow escape gap 24 remains between the drive tube 9 and the drive rod 19, through which the liquid present in the space 25 can escape. It is furthermore possible to dispose above the reinforced drive rod section 19, a helical spring 26 concentrically and coaxially to the drive rod 6, for further braking the fall of the shutdown member 3.

The lower end of the drive rod 6, as viewed in FIG. 2, has a telescopically insertable end piece 27 which is biased by a helical spring 28 against the drive rod 6 proper and acts as a residual shock absorber when the control member 2 encounters the upper cover plate of the fuel element. A soft scales spring 29 is disposed coaxially to the helical spring 28 and is continuously compressed only when the shutdown member 3 is fully inserted and additionally depresses the control member 2. The position of the control member 2 can thereby be used additionally for indicating the position of the shutdown member 3.

In FIG. 3, there is provided a cross-sectional view of the dual control member 1 facing toward the two spider-shaped holders and the finger absorber rods suspended from them. According to the embodiment illustrated therein, a dual control element, which is coordinated with a single fuel element 30, respectively, has eight grey rods 4 that are inserted into suitable positions of the fuel element and on which the individual fuel rods would otherwise be located. Furthermore, 12 black finger rods 7 are provided for the shutdown member 3 so that the entire dual control member has a total of twenty finger rods acting as absorbers.

The details of the drive are shown on an enlarged scale in FIG. 4. The drive component member 2 is formed in a conventional manner, of a pawl step lifter 12 with a lifting coil 13, engagement coil 14 and holding coil 15; in this figure, there are further shown grooves 31 formed in the control member drive rod 6, the pawls 32 of the pawl step lifter 12 being engageable therein and permitting a stepwise displacement of the control element upon the disengagement thereof from groove to groove.

To hold the shutdown member 3 in its upper end position as shown in FIG. 4, the upper end of the drive tube 9 is constructed as a magnetic hollow armature 33 and is formed of magnetic material. The drive 9 is thus held in its upper end position by means of the additional holding coil 16. In a conventional manner, a yoke 34 of non-magnetic material is provided, in addition, in the vicinity of the holding coil 16 in order to assure a flux of lines of force through the magnetic hollow armature 33.

When the holding coil 16 is de-energized, the shutdown member 3 drops, under the action of gravity alone, into the reactor core. In order to accelerate the fall, a so-called catapult spring 35 can additionally be provided. The spring 35 is constructed as a helical spring and is disposed on the outside of a cylindrical sleeve 36 which is entrained by the drive tube 9 when the latter is pulled out, so that the spring 35 is stressed. When the coil 16 is de-energized, the spring 35 can expand and impart an additional pulse to the drive tube 9.

The aforedescribed position indicated for the shutdown member 3 by means of the scales spring 29 in the lower part of the drive rod 6, is not always definite however, as it responds also, for example, if the shutdown member 3 were to jam half-way in with a fully inserted drive rod 6 of the control member 2 and thereby load the scales spring 29. For this reason, a more definite position indication is proposed. For this purpose, as may be seen in particular in FIG. 2, an indicator rod 37 is guided within the drove rod 6 and is provided at its lower end with two pins 38 extending to the outside of the hollow drive rod 6 and a ring 40 connected with the pins 38. When the shutdown member 3 falls, the indicator 37 is pulled downward by the impact of the lower holding ring 42 of the spring 26 onto the ring 40. Through an additional monitoring coil 17 above the pawl step lifter 12, the position of the upper head 39 of the indicator rod 37 can then be determined by the change in inductance.

Figure 5:
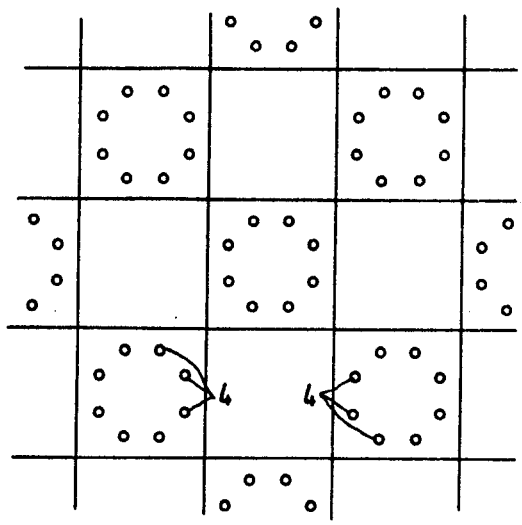
FIG. 5 is a position sketch for the control rods in the reactor core.

In FIG. 5, the distribution of the finger control rods 4 over part of the reactor core is again shown. There is particularly shown therein the uniform and dense distribution of the grey control rods by which a considerable equalization of the power distribution in the reactor can be achieved without having to provide additional drive positions for the shutdown rods which are absolutely required.

In the aforedescribed dual control members, the drive for the control member was based upon a pawl step lifter. It is, however, also possible to use other known drives such as magnetic friction step lifters or rack-and-pinion, rope or lead screw drives with travelling magnetic clutch or the like, whereby a greater inserting and withdrawing velocity for the control rods might possibly be obtained. Moreover, the dual control rod of the aforedescribed embodiment is distinguished by its particularly simple construction, wherein disengaging clutches between the drive rods and the spider-shaped holders are dispensed with. When a change of fuel elements is to be effected, the entire dual control member unit can be removed and transported to the decay tank or spent fuel storage before the core frame is raised. The use of clutches is entirely possible, for instance, so that only the control member is disengaged after being previously raised with the shutdown member in the control member guide and held in raised position there by means of a latch.

In addition, variation of the numerical subdivision and the absorber intensity of the individual finger rods and their distribution over the cross section of the fuel element is possible within wide limits. For example, a "grey" control member can be built up of a correspondingly small number of black fingers. Furthermore, the absorber intensity of the grey rods can be varied over the length of the fingers, for example, by providing only certain sections of the fingers with a stronger absorber action in such a manner that the control member can counteract excess power in the lower reactor half and nevertheless not trigger any dangerous increase in reactivity through inadvertent or accidental adjustment from any level or elevation thereof. To realize the basic concept of the invention, it is unnecessary that the shutdown member be held directly by a magnetic holding coil. Mechanical elements, such as ratchets, for example, can also be used for this purpose, and may be employed either in the control drive or, with indirect actuation, in the interior of the reactor vessel, for example at the upper end of the control member guide 41.

We claim:

1. Device for controlling and shutting-down a pressurized-water nuclear reactor having vertical rod-shaped absorbers displaceable into and out of fuel elements of the reactor core, comprising a dual control member including a control member having a central drive rod, at least one finger control rod means and a first spider-shaped holder securing said finger control rod means to said central drive rod, and a shutdown member comprising a separate second spider-shaped holder disposed coaxially to said central drive rod, and a plurality of finger shutdown rod means carried by said second spider-shaped holder.

2. Device according to claim 1, wherein said second spider-shaped holder is located above said first spider-shaped holder, said shutdown member being displaceable upwardly, and being abuttable with said second spider-shaped holder as it is upwardly displaced.

3. Device according to claim 1, wherein said shutdown member includes a drive tube coaxially surrounding said central drive rod.

4. Device according to claim 3, wherein said drive tube has an upper end constructed as a hollow magnetic armature, and including an electromagnet coil disposed coaxially to a housing of said control drive for receiving and retaining said armature therewithin in energized condition of said electromagnet coil, said electromagnet coil being de-energizable so that said shutdown member is dropped into the reactor core under the action of gravity.

5. Device according to claim 3, wherein said drive rod has a lower reinforced end, and said drive tube has a lower end widened to conform to the reinforced end of said drive rod in the vicinity of said first spider-shaped holder so that an upper shoulder formed on said reinforced end of said drive rod entrains said shutdown member in raising condition of said drive rod.

6. Device according to claim 5, wherein said lower end of said drive tube is formed as a dahspot, a bead-like thickened portion being located at the reinforced part of said drive rod and defining therebetween and said drive tube, a minimum flow gap.

7. Device according to claim 5 including a spring disposed in said dashpot-shaped lower end of said drive tube and coaxial to said drive rod for braking said shutdown member in falling condition thereof on said shoulder of said reinforced end of said drive rod.

8. Device according to claim 5 including a spring disposed within a recess formed in the lower end of said drive rod for braking an end piece received telescopically in said recess.

9. Device according to claim 8 including an additional scales spring located in said recess and yieldable under additional stress by said shutdown member.

10. Device according to claim 9 including means for indicating the position of a fallen shutdown member comprising a monitor coil indicating the position of said control member when said scales spring is compressed.

11. Device according to claim 7 including means for indicating the position of a fallen shutdown member comprising an indicator rod resiliently retained within said drive rod and formed at a location thereof above said reinforced end of said drive rod with two pins extending to the outside of said drive rod, a ring member held by said two pins so that said indicator rod is downwardly displaceably by impact of a lower holding ring for said spring disposed in said dashpot-shaped lower end of said drive tube on said ring member in falling condition of said shutdown member.

12. Device according to claim 11 including a monitoring coil disposed coaxially to the upper end of said indicator rod.

13. Device according to claim 4 wherein said drive tube is coupled to a catapult spring tensionable upon withdrawal of said shutdown member and having an accelerating effect upon de-energization of said electromagnet holding coil.

* * * * *